United States Patent [19]

Nakagomi et al.

[11] Patent Number: 4,815,825
[45] Date of Patent: Mar. 28, 1989

[54] LIQUID CRYSTAL DISPLAY DEVICE

[75] Inventors: Tamihito Nakagomi; Yasuhiko Kando; Shinji Hasegawa, all of Mobara, Japan

[73] Assignee: Hitachi, Ltd., Tokyo, Japan

[21] Appl. No.: 942,828

[22] Filed: Dec. 17, 1986

[30] Foreign Application Priority Data

Dec. 18, 1985 [JP] Japan ................ 60-282804

[51] Int. Cl.⁴ ............ G02F 1/13; G02F 1/137; C09K 19/34; C09K 19/30
[52] U.S. Cl. ................ 350/337; 252/299.01; 252/299.5; 252/299.61; 252/299.63; 350/334; 350/346; 350/347 E; 350/350 K
[58] Field of Search ............ 252/299.01, 299.63, 252/299.61, 299.5; 350/334, 337, 346, 347 E, 350 R

[56] References Cited

U.S. PATENT DOCUMENTS

| | | | |
|---|---|---|---|
| 4,372,871 | 2/1983 | Toriyama et al. | 252/299.63 |
| 4,431,853 | 2/1984 | Sato et al. | 252/299.61 |
| 4,522,470 | 6/1985 | Iijima | 252/299.63 |
| 4,577,931 | 3/1986 | Kiyomaga et al. | 252/299.63 |
| 4,622,162 | 11/1986 | Kimura et al. | 252/299.63 |
| 4,643,841 | 2/1987 | Ishii et al. | 252/299.63 |
| 4,652,088 | 3/1987 | Kando et al. | 350/334 |
| 4,653,861 | 3/1987 | Kando et al. | 350/337 |
| 4,664,482 | 5/1987 | Kando et al. | 350/346 |

FOREIGN PATENT DOCUMENTS

| | | | |
|---|---|---|---|
| 59-6274 | 1/1984 | Japan | 252/299.61 |
| 60-20993 | 2/1985 | Japan | 252/299.63 |
| 60-101183 | 6/1985 | Japan | 252/299.61 |
| 61-120123 | 6/1986 | Japan | 252/299.63 |
| 2067586 | 7/1981 | United Kingdom | 252/299.61 |
| 2077286 | 12/1981 | United Kingdom | 252/299.63 |
| 86/05799 | 10/1986 | World Int. Prop. O. | 252/299.61 |

Primary Examiner—Teddy S. Gron
Attorney, Agent, or Firm—Antonelli, Terry & Wands

[57] ABSTRACT

A liquid crystal display device including a nematic liquid crystal composition having a twist angle of 160° to 260° of liquid crystal molecules and at least one compound of the formula:

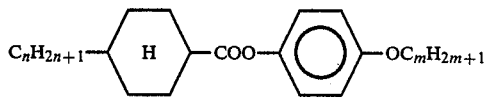

(m, n=1-7) is further improved in time-multiplexability and display quality.

4 Claims, 7 Drawing Sheets

LIQUID CRYSTAL DISPLAY DEVICE

BACKGROUN OF THE INVENTION

This invention relates to a field effect type liquid crystal display device having excellent time-multiplexability.

Well-known twisted nematic type liquid crystal display devices comprise a pair of electrode substrates interposing therebetween a nematic liquid crystal composition having positive dielectric anisotropy and a 90° twisted helical structure, and a pair of polarizers placed outside the electrode substrates, the polarization axes (or absorption axes) of polarizers being perpendicular or parallel to the direction of the major axis of the liquid crystal molecules adjacent to the electrode substrates. But these liquid crystal display devices are insufficient in the time-multiplexability resulting in the number of time-multiplexing of 32 or 64 at most. But such small number of time-multiplexing cannot satisfy recent severe demands for improving image quality of liquid crystal display devices and treating an increased amount of information to be displayed.

In order to provide liquid crystal display devices having the number of time-multiplexing of 100 or more as well as good image quality, some of the present inventors have proposed novel type cell structures having a twist angle of larger than 90° and combined with a special polarizer (U.S. patent application Ser. Nos. 644,766, now U.S. Pat. No. 4,653,861; 695,942, now U.S. Pat. No. 4,652,088, 838,712, now U.S. Pat. No. 4,664,482; and 888,429, now U.S. Pat. No. 4,759,612). But these cells were still insufficient in the time-multiplexability and display image quality.

SUMMARY OF THE INVENTION

It is an object of this invention to provide a liquid crystal display device having better time-multiplexability and display image quality overcoming disadvantages of the novel type cell structures from the viewpoint of liquid crystal materials.

This invention provides a liquid crystal display device comprising a pair of electrode substrates placed oppositely and interposing therebetween a nematic liquid crystal composition containing one or more chiral materials and having positive dielectric anisotropy and a helical structure of liquid crystal molecules twisted at an angle of 160° to 260° with respect to the thickness direction, and a pair of polarizers placed outside the electrode substrates, the polarization axes or absorption axes of the polarizers inclining at an angle of 20° to 70° with respect to the direction of the major axis of the liquid crystal molecules adjacent to the electrode substrates, and a product of $\Delta n \cdot d$ wherein $\Delta n$ is refractive index anisotropy of the liquid crystals and d is the thickness of a liquid crystal layer in terms of $\mu m$ being 0.7 to 1.2 $\mu m$, characterized in that said nematic liquid crystal composition comprises 5 to 60% by weight of at least one compound of the formula:

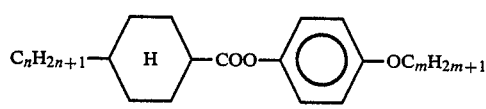

(I)

wherein m and n are independently an integer of 1 to 7.

DESCRIPTION OF THE PREFERRED EMBODIMENTS

The liquid crystal display device of this invention is characterized by having a structure wherein a nematic liquid crystal composition having positive dielectric anisotropy and including at least one chiral material is interposed between a pair of electrode substrates placed oppositely, liquid crystal molecules in a liquid crystal layer has a helical structure twisted at 160° to 260° (a twist angle of 160° to 260°) with respect to the thickness direction of the layer, polarization axes or absorption axes of a pair of polarizers placed outside the electrode substrates are inclined at an angle of 20° to 70° with respect to the direction of the major axis of the liquid crystal molecules adjacent to the electrode substrates, and a product of $\Delta n \cdot d$ wherein $\Delta n$ is refractive index anisotropy of liquid crystals and d is the thickness of the liquid crystal layer is in the range of 0.7 to 1.2 $\mu m$.

In order to orient liquid crystal molecules so as to have a 90° twisted helical structure between a pair of electrode substrates, surfaces of the electrode substrates contacting the liquid crystals are, for example, rubbed with a cloth at one direction (a so-called rubbing method) with a tilt angle of 1° to 3° with respect to the electrode substrate surface. The rubbing direction becomes an alignment direction of the liquid crystal molecules. A pair of electrode substrates having been subjected to the orientation treatment are placed oppositely so as to make individual rubbing directions cross at an angle of about 90° with a predetermined distance (or gap) and sealed with a sealant to form a space into which nematic liquid crystals having positive dielectric anisotropy are to be injected. As a result, the liquid crystal molecules are aligned to have a helical structure rotated at an angle of about 90° between the electrode substrates. A pair of polarizers are placed outside the thus constructed liquid crystal cell. In this case, the polarization axes or absorption axes of the polarizers are made almost parallel to the alignment directions of the liquid crystal molecules adjacent to the electrode substrates, respectively.

Parameters showing time-multiplexability can be represented as mentioned below.

Figure 2:
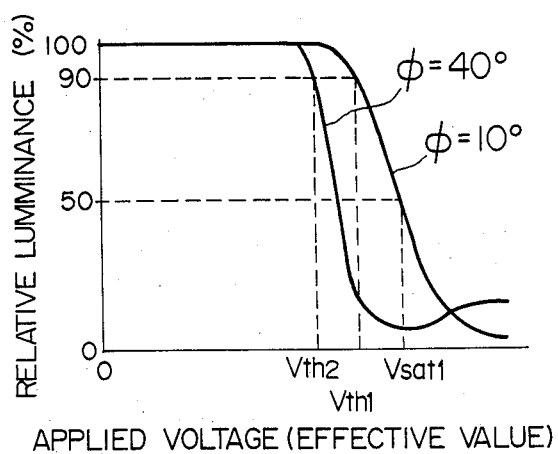
FIG. 2 is a graph showing a typical luminance-voltage characteristics of a prior art liquid crystal display device having a 90° twisted liquid crystal molecule helical structure.

FIG. 2 shows typical luminance-voltage characteristics of a prior art lliquid crystal display device having a 90° twisted helical structure of liquid crystal molecules. In FIG. 2, relative values of relative luminance are taken versus applied voltages and an initial value of luminance is taken as 100% and a final value (a value at a sufficiently large applied voltage) is taken as 0%. Generally speaking, a voltage taking a relative luminance of 90% is defined as a threshold value $V_{th}$ and a voltage taking a relative luminance of 10% is defined as a saturated value $V_{sat}$ for the sake of a measure of properties of liquid crystals. In practical use, when the relative luminance is 80% or more, picture elements are sufficiently bright and the liquid crystals can be regarded as an OFF state. On the other hand, when the relative luminance is 20% or less, picture elements are sufficiently dark and the liquid crystals can be regarded as an ON state. In this invention, the threshold voltage $V_{th}$ is defined as a voltage showing a relative luminance of 80% and the saturated voltage $V_{sat}$ is defined as a voltage showing a relative luminance of 20%.

Further, electro-optical properties of liquid crystal devices also change depending on directions of viewing. Such properties limit the field of vision giving good display quality.

Figure 3:
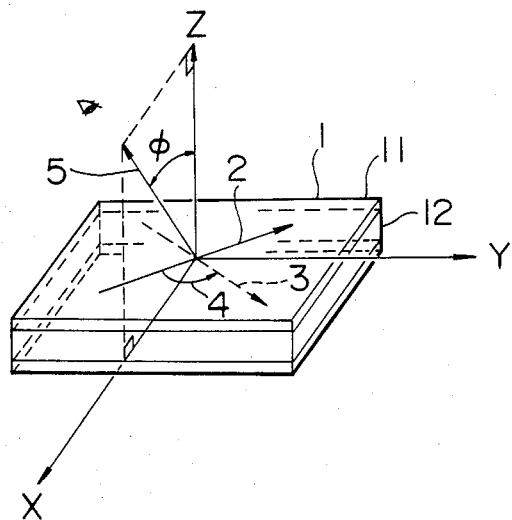
FIG. 3 is a perspective view for explaining the definition of a viewing angle $\phi$.

The definition of viewing angle $\phi$ is explained referring to FIG. 3. In FIG. 3, numeral 2 denotes a rubbing direction of an upper electrode substrate 11 of a liquid crystal display device 1, numeral 3 denotes a rubbing direction of a lower electrode substrate 12, and numeral 4 denotes a twist angle of liquid crystal molecule. Rectangular coordinates having X and Y axes are taken on a surface of the liquid crystal device 1 so as to make the X axis direction as the direction which equally divides the twist angle 4 of the liquid crystal molecule, and to take a Z axis at a normal line direction with respect to the X Y plane. Thus, an angle between a viewing direction 5 and the Z axis is defined as the viewing angle $\phi$. In this case, the viewing direction is on the XZ plane for simplicity. Further, the angle of $\phi$ in FIG. 3 is taken as positive. When viewed from such a direction, the contrast becomes high, so that such a direction is defined as a visual field direction.

In FIG. 2, when a voltage so as to make the relative luminance 80% is taken as $V_{th\,1}$ and the relative luminance 20% as $V_{sat\,1}$ in the case of the angle $\phi$ of 10°, and a voltage so as to make the relative luminance 80% at the angle $\phi$ of 40° is taken as $V_{th\,2}$, slope of luminance-voltage characteristics $\gamma$, viewing-angle characteristics $\Delta\phi$ and time-multiplexability m are defined as follows:

$$\gamma = \frac{V_{sat\,1}}{V_{th\,1}}$$

$$\Delta\phi = \frac{V_{th\,2}}{V_{th\,1}}$$

$$m = \frac{V_{th\,2}}{V_{sat\,1}}$$

The time-multiplexability of prior art liquid crystal display device having a twist angle of 90° depends on the product $\Delta n \cdot d$ wherein $\Delta n$ is the refractive index anisotropy and d is the thickness of liquid crystal layer (a gap between a pair of electrode substrates). When the value of $\Delta n \cdot d$ is large, for example, 0.8 μm or more, the $\gamma$ characteristics is better (small) but the $\Delta\phi$ characteristics is worse (small). On the other hand, when the value of $\Delta n \cdot d$ is small, for example, less than 0.8 μm, the $\gamma$ characteristics is worse (large) but the $\Delta\phi$ characteristics is better (large). But when compared from the viewpoint of the m characteristics, $\Delta n \cdot d$ of smaller values is better. Concrete examples in the case of the twist angle of 90° are shown in Table 1.

TABLE 1

| Characteristics | $\Delta n \cdot d$ | |
|---|---|---|
| | 0.5 μm | 1.0 μm |
| $\gamma$ | 1.230 | 1.150 |
| $\Delta\phi$ | 0.945 | 0.860 |
| m | 0.768 | 0.748 |

Figure 4:
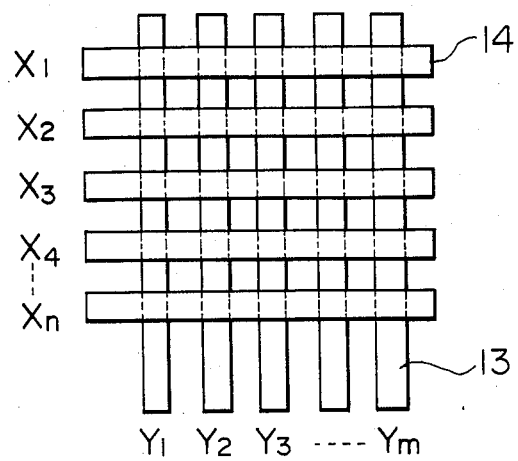
FIG. 4 is a plan view for explaining time-multiplexing drive.

Time-multiplexing drive is explained taking a dot matrix display as an example. As shown in FIG. 4, Y electrodes (signal electrodes) 13 in the form of stripes are formed on the lower electrode substrate 12 and X electrodes (scanning electrodes) 14 in the form of stripes are formed on the upper electrode substrate 11. The display of letters and the like is conducted by making the crossing portions of X and Y electrodes the ON state or the OFF state. In FIG. 4, the time-multiplexing drive is obtained by repeating line-at-a-time scanning of the scanning electrodes in number of n in the order of $X_1, X_2, \ldots X_n, X_1, X_2, \ldots X_n$. When a certain scanning electrode is selected, display signal of selection or non-selection is given simultaneously to all the picture elements on the selected electrode by the signal electrodes 13 ($Y_1, Y_2, \ldots Y_n$) depending on the signal to be displayed. As mentioned above, ON and OFF states at the crossed portions can be selected by the combination of voltage pulses applied to the scanning electrodes and the signal electrodes. In this case, the number of scanning electrodes X corresponds to the number of time-multiplexing.

Figure 5:
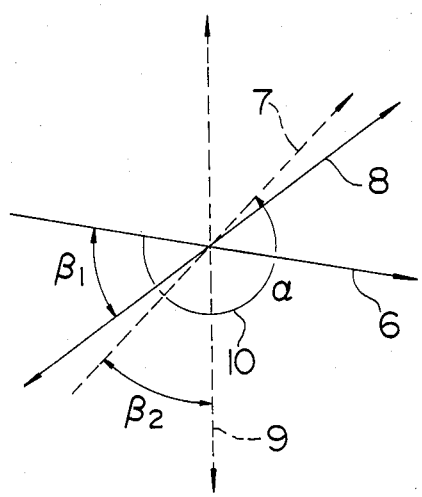
FIG. 5 is a plan view of a cell having a larger twist angle and for explaining an inclination angle $\beta$.
Figure 6:
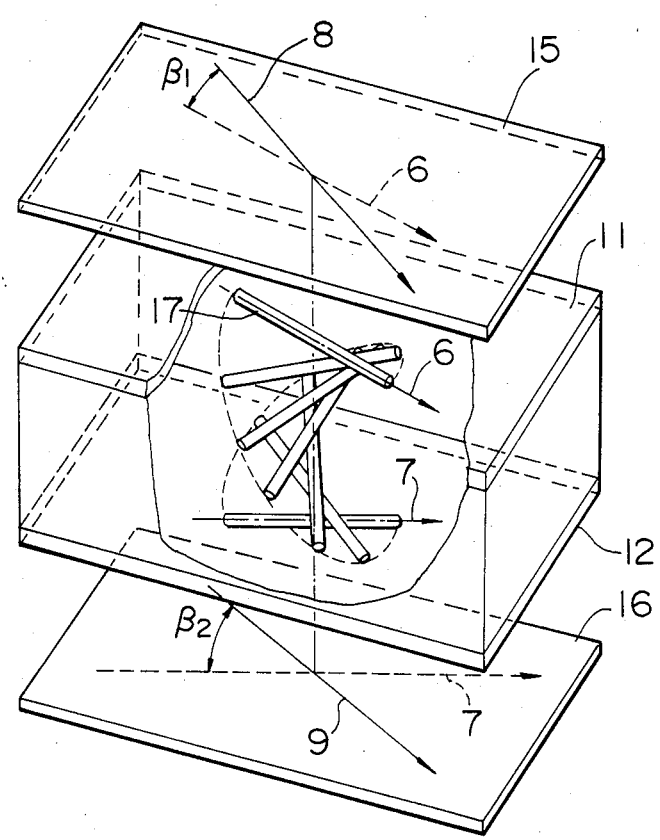
FIG. 6 is a perspective view showing the structure of liquid crystal display device of this invention.

FIG. 5 shows a relationship between the liquid crystal molecule aligning directions (e.g., rubbing directions) of electrode substrates, the twist direction of liquid crystal molecules, and the polarization axes (or absorption axes) of polarizers of a liquid crystal display device according to the present invention, when the liquid crystal display device is viewed from the upper direction. FIG. 6 is a perspective view showing this relationship. In actuality, members shown in FIG. 6 are unitarily assembled. Upper and lower electrode substrates 11 and 12 each having a surface structure subjected to aligning treatment by which the major axes of liquid crystal molecules adjacent to the substrate are aligned or oriented in a predetermined direction, are sealed with a sealing agent, and a nematic liquid crystal composition added with a chiral (or optical active) material is filled in a space defined between the substrates. Upper and lower polarizers 15 and 16 are placed outside the electrode substrates 11 and 12. Reference numeral 20 represents a reflector plate to be disposed below the lower polarizer 16 when the liquid crystal display device is of a reflection type.

A twist direction 10 (indicated by a curved allow) and a twist angle α of liquid crystal molecules 17 are defined by the aligning or rubbing direction 6 of the upper substrate 11, the aligning or rubbing direction 7 of the lower substrate 12, and the kind and amount of the chiral material added to the nematic liquid crystal composition. In particular, the twist direction is determined by the kind of chiral material. The twist angle is determined by the rubbing directions 6 and 7 of the upper and lower electrodes 11 and 12. The stability of orientation of the liquid crystal molecules is determined by a specific pitch of the chiral material, the amount thereof, and the thickness of a liquid crystal layer. When the twist angle $\alpha$ is large (for example, in the vicinity of 260°), it is preferable to use a known oblique evaporation method for the aligning treatment instead of the rubbing method. For example, silicon oxide (SiO) is evaporated from a direction having the inclination of 3°–10° with respect to the electrode substrate surface to form a liquid crystal molecule aligning film. Namely, it is preferable that the inclination angle of the major axis of the liquid crystal molecules adjacent to the electrode substrate with respect to the substrate (i.e. a tilt angle) is made larger. In such a case, a direction reverse to the rubbing direction shown by arrow in FIGS. 5 and 6 is employed as the direction of oblique evaporation.

The maximum value of the twist angle $\alpha$ is limited to 260° because the liquid crystal structure with the twist angle of more than that results in scattering of light and deterioration of contrast. The lower limit of the twist angle $\alpha$ is determined by contrast and the time-multiplexed drive characteristics and is given to be 160°.

Each of an angle $\beta_1$ between a polarization axis 8 of the upper polarizer 15 and the rubbing direction 6 of the upper substrate 11 and an angle $\beta_2$ between a polarization axis 9 of the lower polarizer 16 and the rubbing direction 7 of the lower substrate 12 preferably falls within a range between 20° and 70° when contrast, brightness, color and the like are considered.

When the optical or refractive index anisotropy of the liquid crystal and the thickness of the liquid crystal layer are given to be $\Delta n$ and d ($\mu m$), respectively, the liquid crystal display device according to the present invention depends on $\Delta n \cdot d$, i.e., an optical path difference. When a condition of $0.7 \, \mu m \leq \Delta n \cdot d \leq 1.2 \, \mu m$ is satisfied in consideration of contrast, brightness, color and the like, satisfactory results are obtained. The optical anisotropy $\Delta n$ generally depends on wavelengths. The optical anisotropy is increased when the wavelength is short, while it is decreased when the wavelength becomes long. The values of optical anisotropy $\Delta n$ used in the present specification are measured by using an He-Ne laser beam of a wavelength of 6,328 Å at a temperature of 25° C. When the optical anisotropy is measured at another wavelength, it may be slightly different from that disclosed in the present specification.

Figure 1:
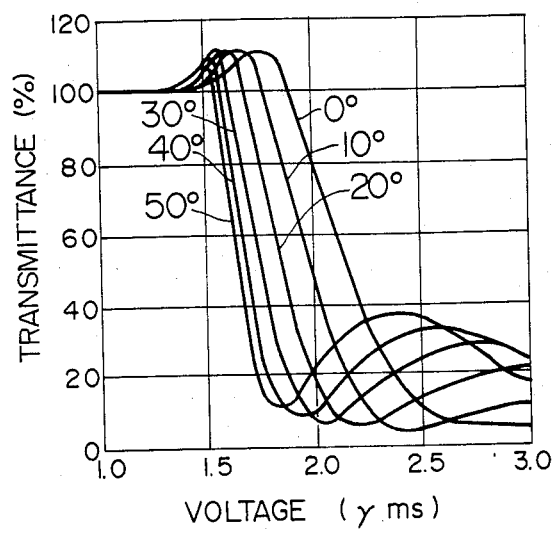
FIG. 1(a) is a graph showing viewing angle dependence of voltage-transmittance characteristics of a prior art device having a twist angle of 90°.
FIG. 1(b) is a graph showing viewing angle dependence of voltage-transmittance characteristics of a device of this invention having a twist angle of 180°.
FIG. 1(c) is a graph showing a relationship between a total of carbon numbers (m+n) of alkyl groups of liquid crystal materials and $\gamma$ characteristics in the cases of a twist angle of 90° and a twist angle of 180°.
Figure 1:
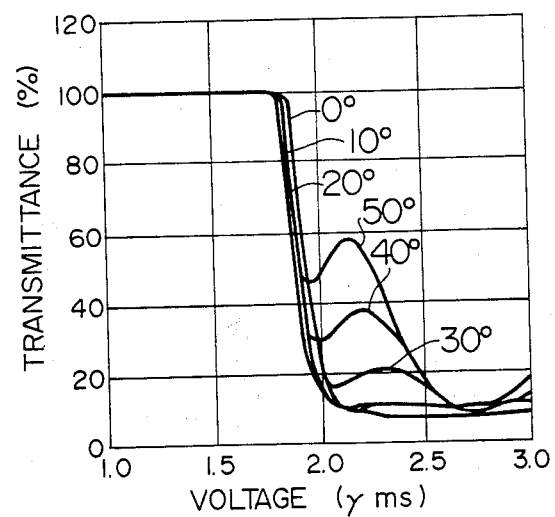
Figure 1:
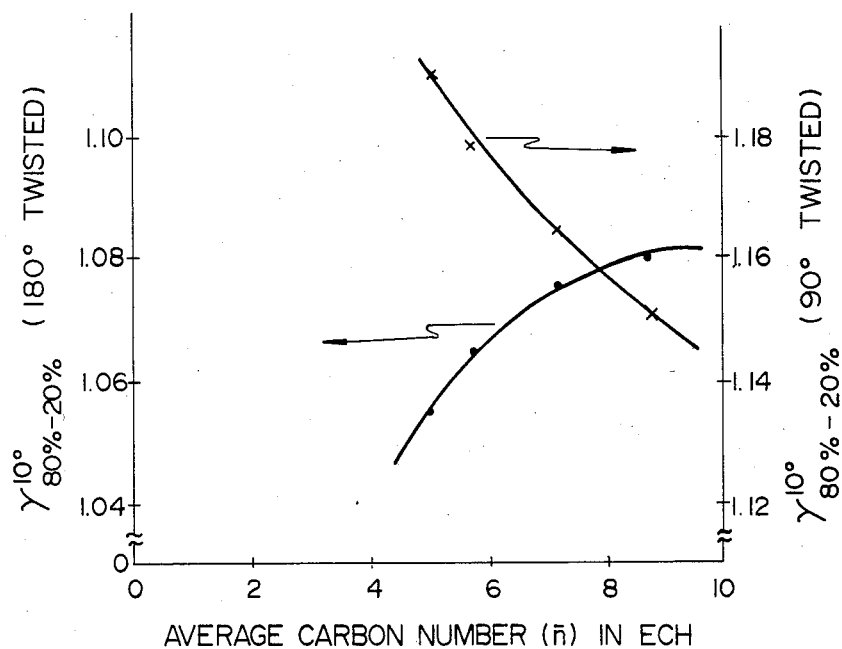

In this invention, the twist angle is 160° to 260°. In the case of devices having such a cell structure as having the twist angle of 160° to 260°, a quite different tendency is shown on various properties compared with the prior art devices having the twist angle of 90°. Therefore, the selection of liquid crystal materials is quite different between the cases of twist angle of 90° and that of 160° to 260°. For example, FIGS. 1(a) and 1(b) show viewing angle dependence of voltage-transmittance characteristics in the case of 90° twisted (FIG. 1(a)) and 180° twisted (FIG. 1(b)). As is clear from FIGS. 1(a) and 1(b), the device having a 180° twisted structure has a steep curve in the $\gamma$ characteristics (slope of transmittance-voltage characteristics) and thus is clearly improved in the $\gamma$ characteristics compared with the prior art device having a 90° twisted structure. This tendency becomes remarkable with an increase of the twist angle. As mentioned above, the liquid crystal display devices having a 160°–260° twisted structure have improved $\gamma$ characteristics with steep transmittance-voltage curves, so that the difference in the transmittance becomes larger between on application or non-application of voltage in time-multiplexing drive and makes possible higher time-multiplexing drive than before.

The $\gamma$ characteristics can be improved when the twist angle of liquid crystals is made larger, compared with the case of the twist angle of 90°. But the present inventors have found that the $\gamma$ characteristics take different behaviors depending on liquid crystal materials used in the case of 90° twisted structure and in the case of 160°–260° twisted structure. It has generally been admitted that the smaller the elastic constant ratio ($K_{33}/K_{11}$) becomes, the better the $\gamma$ characteristics become in the case of 90° twisted structure (Gunter Bauer: "The influence of material and device parameters on the optical characteristics of liquid crystal display", Molecular Crystals and Liquid Crystals, 1981, vol. 63, pp. 45–58.) But this theory cannot be applied to the case of 160°–260° twisted structure, reasons for this being not known yet.

For example, in the 90° twisted structure, a material containing pyrimidine type compounds

Figure 7:
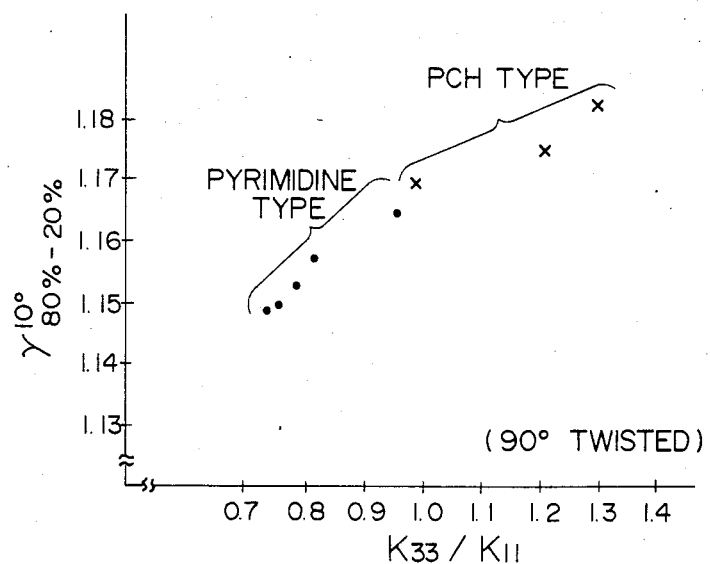
FIG. 7 is a graph showing a relationship between elastic constant ratios and $\gamma$ characteristics of a device having a twist angle of 90°.

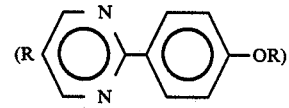

which has a small elastic constant ration ($K_{33}/K_{11}$) is better. This is clearly shown in FIG. 7, wherein $\gamma^{10°}{}_{80\%-20\%}$ means $\gamma$ characteristics in terms of a ratio of voltage showing 80% transmittance to voltage showing 20% transmittance at a viewing angle of 10° (an angle from the normal line), the transmittance being shown in FIG. 1. In FIG. 7, PCH type means phenylcyclohexane type liquid crystals.

Figure 8:
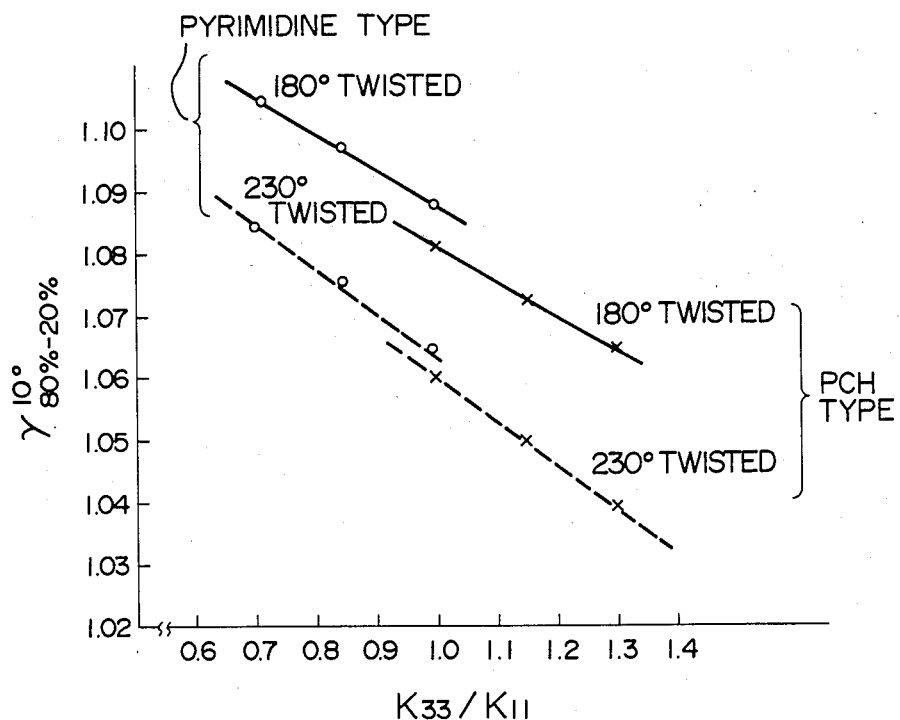
FIG. 8 is a graph showing a relationship between elastic constant ratios and $\gamma$ characteristics of devices having a twist angle of 180° and a twist angle of 230°.

FIG. 8 shows a relationship between the elastic constant ratio ($K_{33}/K_{11}$) and the $\gamma$ characteristics ($\gamma^{10°}{}_{80\%-20\%}$) in the cases of 180° twisted structure and 230° twisted structure. As is clear from FIG. 8, the $\gamma$ characteristics of the pyrimidine type compounds are poorer than those of the PCH type compounds in contrast to the results shown in FIG. 7.

As mentioned above, when the twist angle is about 200°, the heretofore admitted theory cannot be applied; that is the PCH type compounds show better $\gamma$ characteristics than the pyrimidine type compounds. This means that liquid crystal materials used for the devices having a 160°–260° twisted structure should be selected from a quite different viewpoint compared with the case of prior art device having a 90° twisted structure. Further, FIG. 8 shows that the $\gamma$ characteristics are improved when the twist angle is increased to 230° from 180°.

Figure 9:
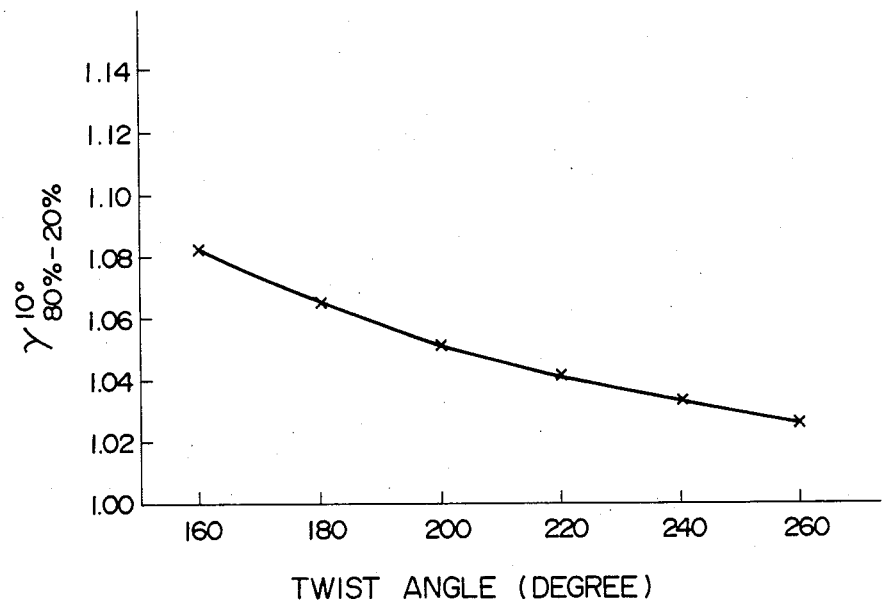
FIG. 9 is a graph showing a relationship between twist angles and $\gamma$ characteristics.

FIG. 9 shows a relationship between the $\gamma$ characteristics ($\gamma^{10°}{}_{80\%-20\%}$) and the twist angle of 160°–260° twisted liquid crystal display devices. As is clear from FIG. 9, the $\gamma$ characteristics are further improved with an increase of the twist angle.

The liquid crystal composition used in the liquid crystal display device of this invention comprises nematic liquid crystal compounds having positive dielectric anisotropy, added with at least one chiral material, and including at least one compound of the formula:

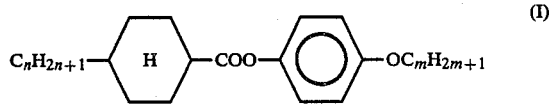

(I)

wherein m and n are independently an integer of 1 to 7, in an amount of 5 to 60% by weight.

When the amount is outside the above-mentioned range, the object of this invention cannot be attained.

Further, it is preferable that the liquid crystal composition used in this invention contains the following additional liquid crystal materials:

(A) Liquid crystal materials for setting higher N-I point:

Since the twist angle of the liquid crsytal molecules is 160° to 260°, color change depending on the temperature change is sensitive. Thus, it is preferable to set the N-I point (the nematic-to-isotropic transition temperature) of liquid crystal materials at high temperatures, for example 80° to 100° C. Therefore, it is preferable to use one or more long molecular liquid crystal materials having 3 or 4 benzene rings and/or cyclohexane rings in additon to the compound of the formula (I).

(B) Np liquid crystal materials:

In order to attain an original object of TN (twisted nematic) system drive and to maintain the theshold voltage at a constant value, it is preferable to use one or more Np liquid crystal materials in addition to the compound of the formula (I).

(C) Materials for adjusting Δn (optical anisotropy) and viscosity of the liquid crystal composition.

Since it is preferable that the liquid crystal composition further contains the above-mentioned materials (A) through (C), the upper limit of the amount of the compound of the formula (1) is 60% by weight.

When the compounds of the formula (I) are used in admixture, it is further preferable to use those having an average value of m plus n in the formula (I) being 6 or less in an amount of 10 to 60% by weight.

The liquid crystal composition used in this invention may further comprise 5 to 50% by weight of at least one compound of the formula:

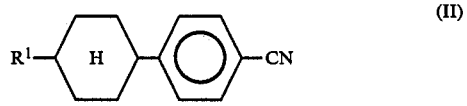

(II)

wherein R¹ is an alkyl group having 2 to 7 carbon atoms, and/or 5 to 30% by weight of at least one compound of the formula:

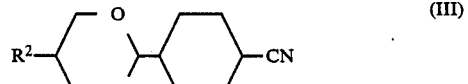

(III)

wherein R² is an alkyl group having 2 to 8 carbon atoms, in addition to the compound of the formula (I)

Preferable examples of the compounds of the formula (I) are as follows:

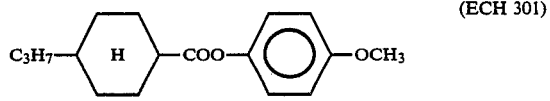
(ECH 301)

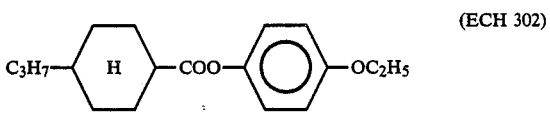
(ECH 302)

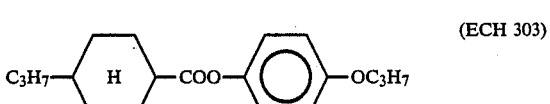
(ECH 303)

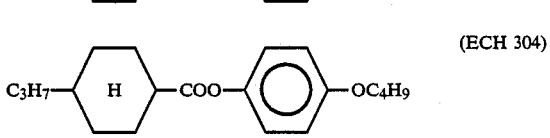
(ECH 304)

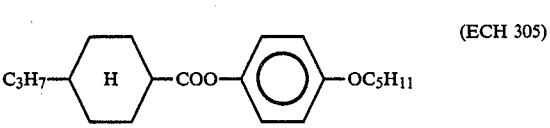
(ECH 305)

(ECH 306)

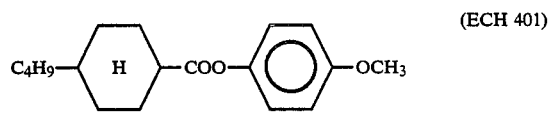
(ECH 401)

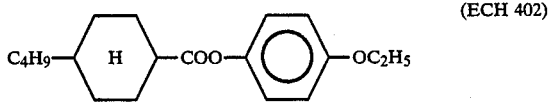
(ECH 402)

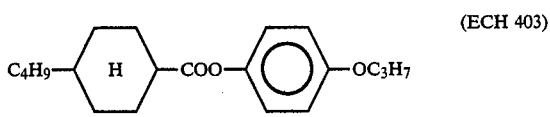
(ECH 403)

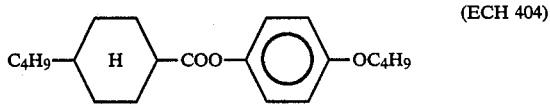
(ECH 404)

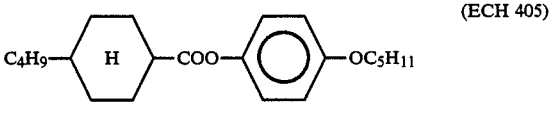
(ECH 405)

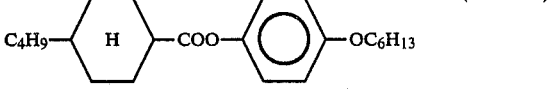
(ECH 406)

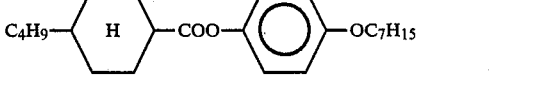
(ECH 407)

-continued
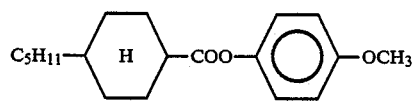 (ECH 501)
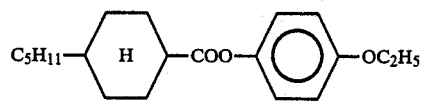 (ECH 502)
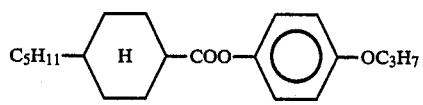 (ECH 503)
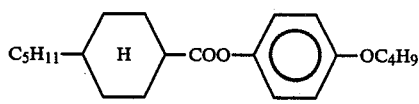 (ECH 504)
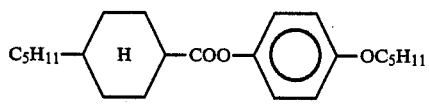 (ECH 505)
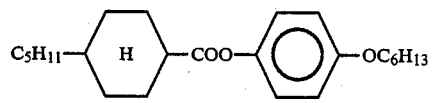 (ECH 506)
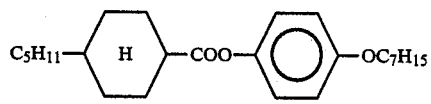 (ECH 507)
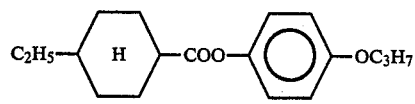 (ECH 203)
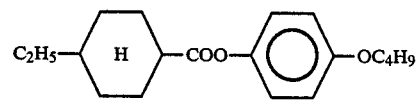 (ECH 204)
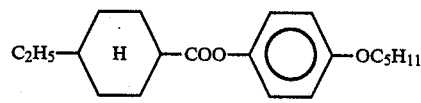 (ECH 205)
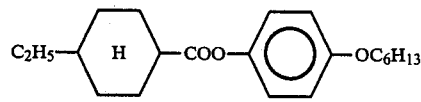 (ECH 206)
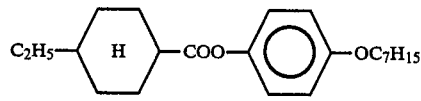 (ECH 207)
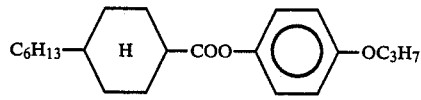 (ECH 603)
-continued
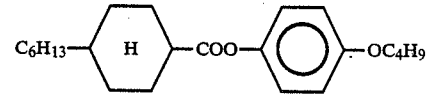 (ECH 604)
Preferable examples of the compounds of the formula (II) are as follows:
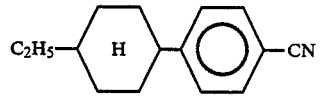
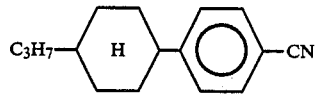
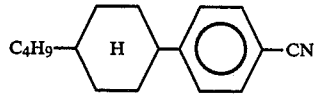
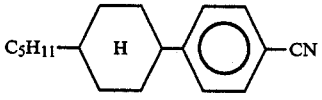
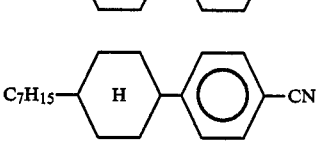
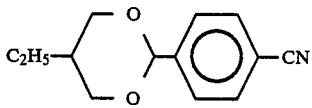
Preferable examples of the compounds of the formula (III) are as follows:
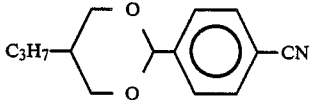
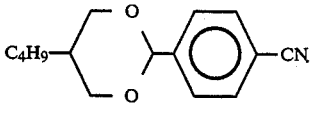
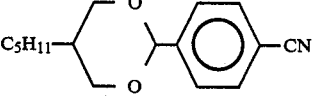
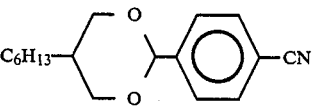

The above-mentioned liquid crystal composition may further contain the following compounds in amounts of preferably 30% by weight or less, more preferably 20% by weight or less, in addition to the compounds of the formulae (I), (II) and/or (III):

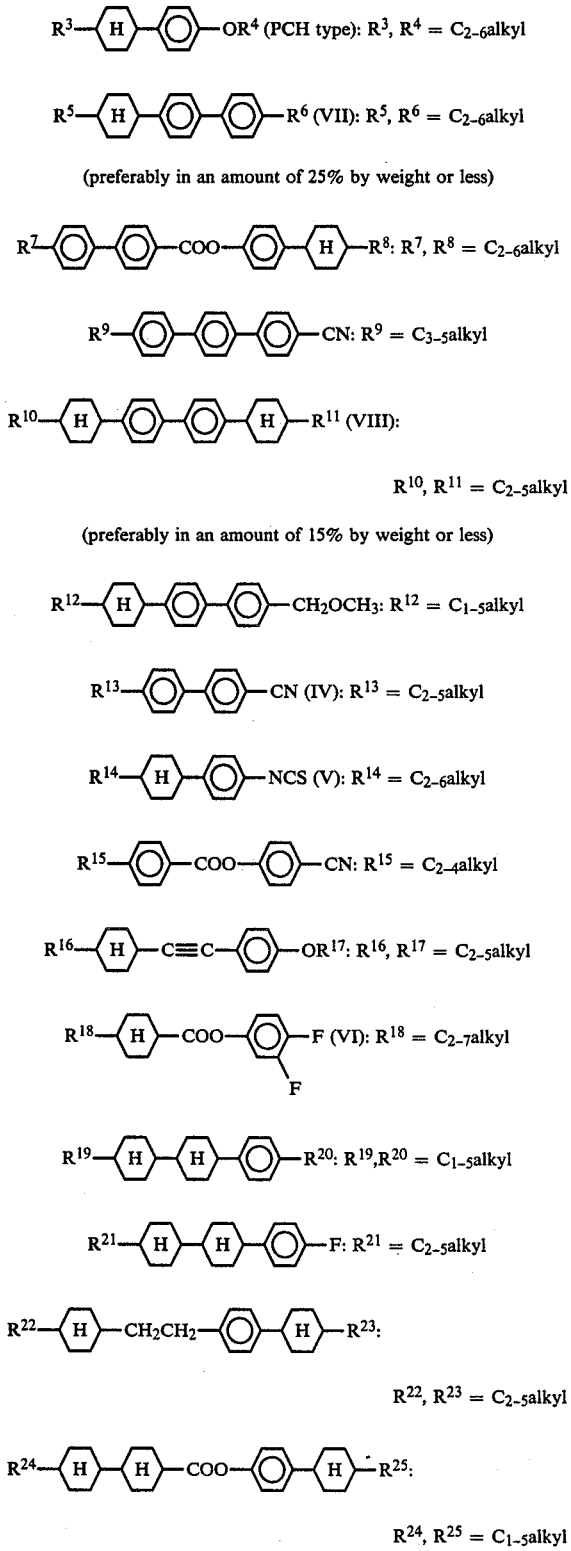

As the chiral material, there can be used

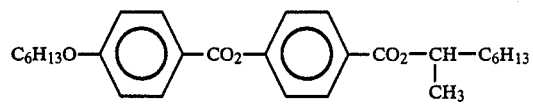

(S811, a trade name, mfd. by Merck)

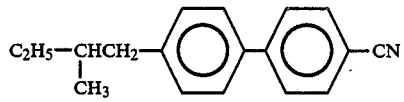

(CB-15, a trade name, mfd. by Merck), etc.

The amount of the chiral material to be used can be decided based on the following conditions:

(i) The composition of a liquid crystal mixture to which the chiral material is to be added (pitch (p) after the admixture of the chiral material also depends on the composition of liquid crystal mixture).

(ii) The cell thickness (d) of the liquid crystal display device.

(iii) Twist angle:

For example, in the case of a twist angle of 180°, normal operation can be carried out at d/p=0.4–0.5.

This invention is illustrated by way of the following Examples.

In the following Examples, S811 (a trade name, mfd. by Merck) was used as the chiral material in an amount suitable for obtaining the desired twist angle (in the case of the twist angle of 180°, d/p=0.40–0.50, wherein p is the pitch of the chiral liquid crystal, and d is the cell thickness of the liquid crystal cell). The liquid crystal display devices used in the Examples had the structure as shown in FIG. 6. As the electrode substrates, there were used those obtained by coating or printing an organic orientation film (polyimide film) thereon and rubbing the surfaces thereof with a sheet of gauze in a predetermined direction. The angle of the major axis of the liquid crystal molecules adjacent thereto with respect to the surface of the electrode substrates (a tilt angle) was about 3°. The surface of the electrode substrates used in the Examples for evaluating liquid crystal materials were oriented in a predetermined direction by the rubbing method. The tilt angle obtained by the rubbing method is in general 3° or less and 5° at most. The tilt angle was measured according to the article by K. Suzuki, et al disclosed in Appl. Phys. Lett., 33 (7), p 561 (1978). Further, the inclination angle between the polarization axes or absorption axes of the polarizers and the alignment direction of the liquid crystal molecules adjacent to the electrode substrates was 45° in the case of the twist angle of 180°.

EXAMPLE 1

In the above-mentioned liquid crystal display device, the following liquid crystal composition (1) was sealed and tested.

| Composition (1) | |
| --- | --- |
| A | 39% by wt. |
| $C_3H_7$—⟨H⟩—⟨O⟩—CN | 30% by wt. |

-continued

Composition (1)

C5H11—(H)—(O)—(O)—CH2OCH3  7% by wt.

C3H7—(H)—(O)—(O)—CH2OCH3  7% by wt.

C3H7—(O)—(O)—COO—(O)—(H)—C3H7  5% by wt.

C3H7—(O)—(O)—COO—(O)—(H)—C5H11  5% by wt.

C5H11—(O)—(O)—COO—(O)—(H)—C3H7  3% by wt.

C5H11—(O)—(O)—(O)—CN  4% by wt.

In the above-mentioned compositon (1), the following ester cyclohexane (ECH) type liquid crystal equimolar mixtures (A−1) through (A−4) were used as the component A as shown in Table 2. The average number ($\bar{n}$) of a total carbon number of n+m in the formula (I), the refractive index anisotropy (Δn), the viscosity in terms of cp unit, and N−I transition point ($T_{N-I}$) of the mixtures (A−1) through (A−4) were also listed in Table 2.

TABLE 2

| Mixture | Compounds (in equimole) | $\bar{n}$ | Δn (20° C.) | Viscosity (25° C.) cps | $T_{N-I}$ (°C.) |
|---|---|---|---|---|---|
| A-1 | ECH 301 ECH 402 ECH 401 ECH 302 | 5 | 0.142 | 17 | 100 |
| A-2 | ECH 301 ECH 302 ECH 304 ECH 401 ECH 402 ECH 501 ECH 502 | 5.9 | 0.141 | 19 | 102 |
| A-3 | ECH 304 ECH 305 ECH 302 ECH 501 ECH 402 ECH 403 ECH 406 ECH 405 | 7.2 | 0.140 | 25 | 101 |
| A-4 | ECH 305 ECH 405 ECH 503 ECH 504 ECH 505 | 8.8 | 0.138 | 33 | 100 |

The γ characteristics ($\gamma^{10°}_{80\%-20\%}$) of these liquid crystal compositions were tested when 180° twisted and 90° twisted, and the results were shown in FIG. 1(c).

As is clear from FIG. 1(c), tendencies of twist angles of 180° and 90° are quite contrary to each other. For the prior art device having the twist angle of 90°, it has been explained that the γ characteristics are improved and the contrast is increased due to the reduced elastic constant ratio ($K_{33}/K_{11}$) when the total value of n+m of carbon atom in the alkyl groups in the ECH type liquid crystals is increased. But in the case of device having the twist angle of 180°, the results shown in FIG. 1(c) clearly show that such an explanation cannot be applied and a quite different thinking is required.

Among the mixtures (A−1) to (A−4), the use of (A−1) and (A−2) which have better viscosity values and faster response properties is more preferable than (A−3) and (A−4). That is, the use of the compounds of the formula (I) wherein the average value ($\bar{n}$) of m+n being 6 or less as a major component (50% or more of the ECH type liquid crystals) is preferable.

EXAMPLE 2

The following liquid crystal composition (2) containing 56% by weight of the ECH type liquid crystals of the formula (I) was sealed in the above-mentioned device and the γ characteristics were tested.

Composition (2)

C3H7—(H)—COO—(O)—OCH3 (ECH 301)  28% by wt.

C3H7—(H)—COO—(O)—OC2H5 (ECH 302)  28% by wt.

C3H7—(H)—(O)—CN  20% by wt.

C3H7—(H)—(O)—(O)—C2H5  5% by wt.

C5H11—(H)—(O)—(O)—C4H9  5% by wt.

C5H11—(H)—(O)—(O)—C2H5  7% by wt.

C5H11—(H)—(O)—(O)—(H)—C3H7  7% by wt.

$T_{N-I}$ = 90° C.
Δn = 0.1140 (20° C.)
Viscosity = 17.0 cp (25° C.)
$\gamma^{10°}_{80\%-20\%}$ (180° twisted) = 1.048

EXAMPLE 3

The following liquid crystal composition (3) containing 10% by weight of the ECH type liquid crystal of the formula (I) was sealed in the above-mentioned device and the γ characteristics were tested.

Composition (3)

C3H7—(H)—COO—(O)—OCH3 (ECH 301)  10% by wt.

C3H7—(H)—(O)—OC2H5  14% by wt.

C3H7—(H)—(O)—OC4H9  14% by wt.

C3H7—(H)—(O)—CN  30% by wt.

-continued
Composition (3)

| | |
|---|---|
| 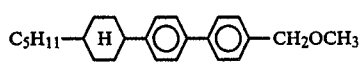 | 7% by wt. |
| 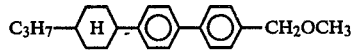 | 7% by wt. |
| 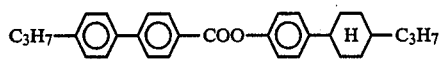 | 8% by wt. |
| 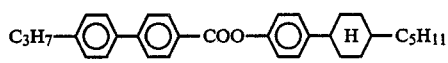 | 5% by wt. |
| 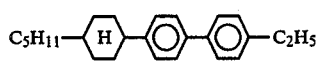 | 5% by wt. |

-continued
Composition (3)

$T_{N-I}$ = 90° C.
$\Delta n$ = 0.1280 (20° C.)
Viscosity = 16 cp (25° C.)
$\gamma^{10°}_{80\%-20\%}$ (180° twisted) = 1.065

The γ characteristics of this Example are not so good as those of Example 2 due to the small amount of the 10% by weight content of the compound of the formula (I) but by for better than those of the device having the twist angle of 90° [see FIG. 1(c)].

EXAMPLE 4

The following liquid crystal composition (4) was sealed in the above-mentioned device and the γ characteristics were tested.

Composition (4)

| | |
|---|---|
| 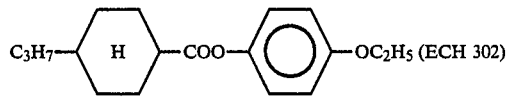 | 23% by wt. |
| 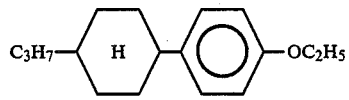 | 23% by wt. |
| 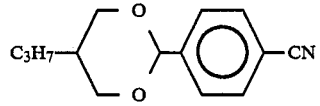 | 10% by wt. |
| 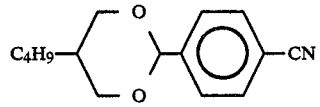 | 10% by wt. |
| 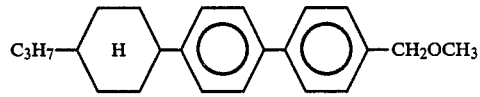 | 7% by wt. |
| 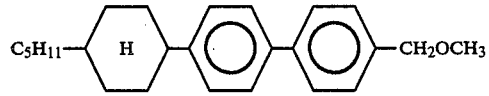 | 7% by wt. |
| 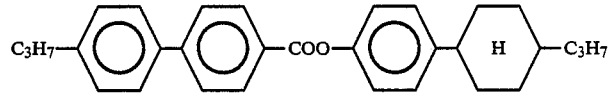 | 10% by wt. |
| 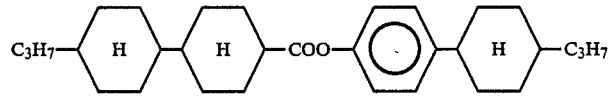 | 5% by wt. |
| 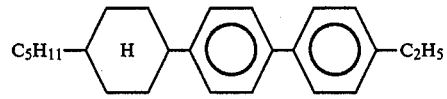 | 5% by wt. |

$T_{N-I}$ = 98° C.
$\Delta n$ = 0.128 (20° C.)

-continued
Composition (4)

Viscosity = 22 cp (25° C.)
$\gamma^{10°}_{80\%-20\%}$ (180° twisted) = 1.055

In this Example, dioxane type liquid crystals were used as those having positive dielectric anisotropy in place of the

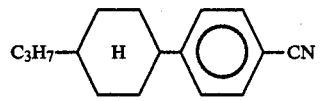

used in Examples 1 to 3. When the dioxane type liquid crystals are used, there is a tendency to increase the viscosity undesirably, but the $\gamma$ characteristics are improved remarkably.

EXAMPLE 5

The following liquid crystal composition (5) was sealed in the above-mentioned device and the $\gamma$ characteristics were tested.

| Composition (5) | |
|---|---|
| C$_3$H$_7$—(H)—COO—(O)—OC$_2$H$_5$ (ECH 302) | 2.5% by wt. |
| C$_4$H$_9$—(H)—COO—(O)—OC$_2$H$_5$ (ECH 402) | 2.5% by wt. |
| C$_3$H$_7$—(H)—(O)—CN | 20% by wt. |
| C$_5$H$_{11}$—(H)—(O)—CN | 10% by wt. |
| C$_3$H$_7$—(H)—(O)—OC$_2$H$_5$ | 10% by wt. |
| C$_3$H$_7$—(H)—(H)—COO—(O)—(H)—C$_3$H$_7$ | 5% by wt. |
| C$_3$H$_7$—(H)—(H)—COO—(O)—(H)—C$_4$H$_9$ | 5% by wt. |
| C$_5$H$_{11}$—(H)—(O)—(O)—C$_2$H$_5$ | 10% by wt. |
| C$_3$H$_7$—(H)—(O)—(O)—C$_2$H$_5$ | 10% by wt. |
| C$_5$H$_{11}$—(H)—(O)—(O)—(H)—C$_3$H$_7$ | 10% by wt. |
| C$_3$H$_7$—(H)—COO—(O)—F, F | 15% by wt. |

T$_{N-I}$ = 102° C.
$\Delta$n = 0.118 (20° C.)
Viscosity = 18 cp (25° C.)

-continued
Composition (5)

$\gamma^{10°}_{80\%-20\%}$ (180° twisted) = 1.067

The $\gamma$ characteristics of this Example are not so good as those of Examples 1 to 4 due to the small content (5% by weight) of the compound of the formula (I) but clearly better than those of the device having the twist angle of 90°.

EXAMPLE 6

The following liquid crystal composition (6) was sealed in the above-mentioned device and the $\gamma$ characteristics were tested.

| Composition (6) | |
|---|---|
| C$_3$H$_7$—(H)—COO—(O)—OC$_2$H$_5$ (ECH 302) | 10% by wt. |
| C$_4$H$_9$—(H)—COO—(O)—OCH$_3$ (ECH 401) | 5% by wt. |
| C$_5$H$_{11}$—(H)—COO—(O)—OCH$_3$ (ECH 501) | 5% by wt. |
| C$_3$H$_7$—(H)—(O)—CN | 15% by wt. |
| C$_4$H$_9$—(H)—(O)—NCS | 15% by wt. |
| C$_2$H$_5$—(O)—(O)—CN | 10% by wt. |
| C$_3$H$_7$—(H)—(O)—OC$_2$H$_5$ | 10% by wt. |
| C$_3$H$_7$—(H)—C≡C—(O)—OC$_2$H$_5$ | 5% by wt. |
| C$_4$H$_9$—(H)—C≡C—(O)—OC$_2$H$_5$ | 5% by wt. |
| C$_5$H$_{11}$—(O)—(O)—(O)—(H)—C$_3$H$_7$ | 10% by wt. |
| C$_4$H$_9$—(O)—(O)—COO—(O)—(H)—C$_2$H$_5$ | 5% by wt. |
| C$_5$H$_{11}$—(O)—(O)—COO—(O)—(H)—CH$_3$ | 5% by wt. |

T$_{N-I}$ = 85° C.
$\Delta$n = 0.165 (20° C.)
Viscosity = 20 cp (25° C.)
$\gamma^{10°}_{80\%-20\%}$ (180° twisted) = 1.06

In this Example, Δn was made large.

EXAMPLE 7

The following liquid crystal composition (7) was sealed in the above-mentioned device and the γ characteristics were tested.

| Composition (7) | |
|---|---|
| C₄H₉—⟨H⟩—COO—⟨O⟩—OC₂H₅ (ECH 402) | 5% by wt. |
| C₃H₇—⟨H⟩—COO—⟨O⟩—OC₃H₇ (ECH 303) | 5% by wt. |
| C₄H₉—⟨H⟩—COO—⟨O⟩—OC₂H₅ (ECH 402) | 5% by wt. |
| C₃H₇—⟨H⟩—⟨O⟩—CN | 10% by wt. |
| C₄H₉—⟨H⟩—⟨O⟩—CN | 10% by wt. |
| C₂H₅—⟨O⟩—COO—⟨O⟩—CN | 8% by wt. |
| C₃H₇—⟨H⟩—COO—⟨O⟩—F (with F) | 10% by wt. |
| C₃H₇—⟨H⟩—⟨H⟩—⟨O⟩—CH₃ | 10% by wt. |
| C₃H₇—⟨H⟩—⟨H⟩—⟨O⟩—OCH₃ | 10% by wt. |
| C₃H₇—⟨H⟩—⟨H⟩—⟨O⟩—F | 10% by wt. |
| C₅H₁₁—⟨H⟩—CH₂CH₂—⟨O⟩—⟨O⟩—C₃H₇ | 5% by wt. |
| C₃H₇—⟨H⟩—CH₂CH₂—⟨O⟩—⟨H⟩—C₂H₅ | 5% by wt. |
| C₅H₁₁—⟨H⟩—⟨O⟩—⟨O⟩—⟨H⟩—C₃H₇ | 7% by wt. |

In this Example, the $T_{N-I}$ was made high and the viscosity was made low.

As explained above, according to the present invention, the characteristics of the liquid crystal display devices can further be improved by making the twist angle of helical structure of liquid crystal molecules as large as 160° to 260° and by using the ECH type compounds of the formula (I) having a lower carbon atom number as an essential component in the liquid crystal composition.

What is claimed is:

1. A liquid crystal display device comprising a pair of electrode substrates placed oppositely and interposing there-between a nematic liquid crystal composition containing chiral material and having positive dielectric anisotropy and a helical structure of liquid crystal molecules twisted with respect to the thickness direction, and a pair of polarizers placed outside the electrode substrates, said device being characterized in that the liquid crystal molecules have a helical structure twisted at 160° to 260° with respect to the thickness direction, the polarization axes or absorption axes of the polarizers are inclined at an angle of 20° to 70° with respect to the direction of the major axes of the liquid crystal molecules adjacent to the electrode substrates and a product of Δn·d wherein Δn is reflective index anisotropy of the liquid crystals and d is a thickness of the liquid crystal layer in terms of μm being 0.7 to 1.2 μm, and said nematic liquid crystal composition comprises 5 to 60% by weight of at least one compound of the formula:

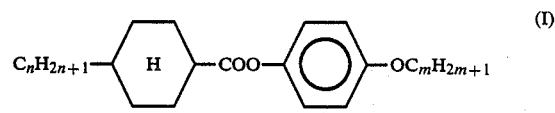

(I)

wherein m and n are independently an integer of 1 to 7, 5 to 50% by weight of at least one member selected from the group consisting of compounds of the formula:

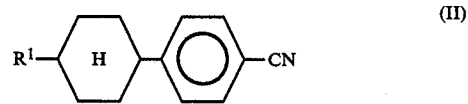

(II)

wherein $R^1$ is an alkyl group having 2 to 7 carbon atoms, and 5 to 30% by weight of at least one compound of the formula:

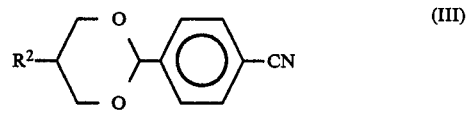

(III)

wherein $R^2$ is an alkyl group having 2 to 8 carbon atoms.

2. A liquid crystal display device according to claim 1, wherein the nematic liquid crystal composition comprises 10 to 60% by weight of compounds of the formula (I) having an average value of a total of m plus n being 6 or less.

3. A liquid crystal display device according to claim 1, wherein the nematic liquid crystal composition further comprises at least one member selected from the group consisting of compounds of the formula:

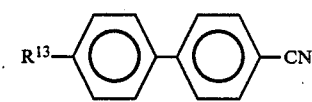

wherein $R^{13}$ is an alkyl group having 2 to 5 carbon atoms, in an amount of 20% by weight or less, compounds of the formula:

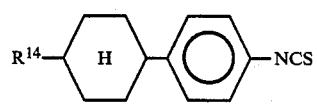

wherein $R^{14}$ is an alkyl group having 2 to 6 carbon atoms
in an amount of 20% by weight or less, and
compounds of the formula:

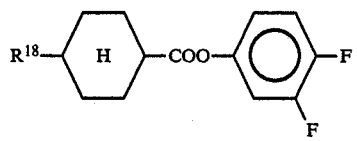

wherein $R^{18}$ is an alkyl group having 2 to 7 carbon atoms.

4. A liquid crystal display device according to claim 1, wherein the nematic liquid crystal composition further comprises at least one member selected from the group consisting of compounds of the formula:

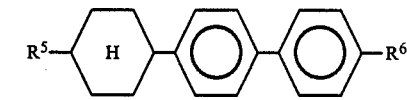

wherein $R^5$ and $R^6$ are independently an alkyl group having 2 to 6 carbon atoms, in an amount of 25% by weight or less, and compounds of the formula:

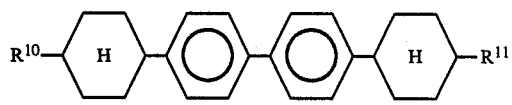

wherein $R^{10}$ and $R^{11}$ are independently an alkyl group having 2 to 5 carbon atoms, in an amount of 15% by weight or less.

* * * * *